United States Patent
Pence (10) Patent No.: US 9,997,795 B2
(45) Date of Patent: Jun. 12, 2018

(54) RELATIVE HUMIDITY ESTIMATORS FOR FUEL CELL STACK PORTS

(71) Applicant: Ford Global Technologies, LLC, Dearborn, MI (US)

(72) Inventor: Benjamin Pence, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 14/866,090

(22) Filed: Sep. 25, 2015

(65) Prior Publication Data

US 2017/0092972 A1 Mar. 30, 2017

(51) Int. Cl.
| | |
|---|---|
| *H01M 8/04* | (2016.01) |
| *H01M 8/04828* | (2016.01) |
| *H01M 8/04119* | (2016.01) |
| *H01M 8/0432* | (2016.01) |
| *H01M 8/0438* | (2016.01) |

(Continued)

(52) U.S. Cl.
CPC ....... *H01M 8/04828* (2013.01); *H01M 8/045* (2013.01); *H01M 8/0435* (2013.01); *H01M 8/04126* (2013.01); *H01M 8/04328* (2013.01); *H01M 8/04335* (2013.01); *H01M 8/04343* (2013.01); *H01M 8/04365* (2013.01); *H01M 8/04388* (2013.01); *H01M 8/04402* (2013.01); *H01M 8/04425* (2013.01); *H01M 8/04589* (2013.01); *H01M 8/1018* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | |
|---|---|---|
| 7,862,935 B2 | 1/2011 | Sinha et al. |
| 2011/0113857 A1 | 5/2011 | Sinha |

(Continued)

OTHER PUBLICATIONS

International Journal of Hydrogen Energy, Elsevier, Cheng Bao, et al., Modeling and control of air stream and hydrogen flow with recirculation in a PEM fuel cell system-I. Control-oriented modeling, available online May 24, 2006.

(Continued)

*Primary Examiner* — Ula C Ruddock
*Assistant Examiner* — Tony S Chuo
(74) *Attorney, Agent, or Firm* — James Dottavio; Brooks Kushman P.C.

(57) ABSTRACT

A water management method for a fuel cell stack (FCS) is provided. The method may include outputting via a controller an FCS anode port estimated relative humidity value based on consumption of reactants and generation of products in the FCS and adjusting a humidification control strategy based on the value. The outputting may be in response to occurrence of a predicted FCS anode port relative humidity value from a model of a hydrogen recirculation system (HRS) of the FCS being within a predefined range. A fuel cell vehicle including a HRS and a controller is also provided. The HRS may include an ejector and a fuel cell stack having an anode port. The controller may be configured to activate a HRS model to calculate a real-time estimate of a relative humidity of the anode port based on an estimated flow rate of a secondary nozzle of the ejector.

8 Claims, 4 Drawing Sheets

(51) Int. Cl.
  *H01M 8/04492*  (2016.01)
  *H01M 8/04537*  (2016.01)
  *H01M 8/1018*   (2016.01)

(56) References Cited

U.S. PATENT DOCUMENTS

| | | | |
|---|---|---|---|
| 2012/0107705 A1* | 5/2012 | Harris | H01M 8/04305 429/415 |
| 2013/0252116 A1 | 9/2013 | Zhang et al. | |
| 2014/0199605 A1 | 7/2014 | Sinha et al. | |
| 2014/0272630 A1 | 9/2014 | Nolan et al. | |

OTHER PUBLICATIONS

Vincenzo Liso, et al., ScienceDirect, International Journal of Hydrogen Energy, Elsevier, Thermal modeling and temperature control of a PEM fuel cell system for forklift applications, available online Apr. 24, 2014.

IEEE Xplore Abstract—Parameterization and validation of a lumped parameter diffusion model for fuel cell membrane humidity estimation, McKay D., et al., University of Michigan, Feb. 3, 2015.

Benjamin Pence, et al., Recursive Estimation for Reduced-Order State-Space Models Using Polynomial Chaos Theory Applied to Vehicle Mass Estimation, IEEE Transactions on Control Systems Technology, vol. 22, No. 1, Jan. 2014.

Benjamin L. Pence, et al., Elsevier, Automatica, Recursive maximum likelihood parameter estimation for state space systems using polynomial chaos theory, Available online Sep. 6, 2011.

\* cited by examiner

RELATIVE HUMIDITY ESTIMATORS FOR FUEL CELL STACK PORTS

TECHNICAL FIELD

This disclosure relates to humidity conditions of a hydrogen stream for fuel cell systems of vehicles in which an ejector recirculates a hydrogen gas mixture.

BACKGROUND

A vehicle, such as a fuel cell vehicle (FCV) or a fuel cell electric vehicle (FCEV), may contain an energy storage device, such as a fuel cell stack, to power components of the vehicle. The fuel cell stack may be integrated with systems to assist in managing vehicle performance and operations. The fuel cell stack may be used with a hydrogen recirculation system to assist in managing water conditions of the fuel cell stack. A polymer electrolyte membrane fuel cell is an example of a fuel cell which may be used with the fuel cell stack.

SUMMARY

A water management method for a fuel cell stack (FCS) includes outputting via a controller an FCS anode port estimated relative humidity value based on consumption of reactants and generation of products in the FCS and adjusting a humidification control strategy based on the value. The outputting is in response to occurrence of a predicted FCS anode port relative humidity value from a model of a hydrogen recirculation system (HRS) of the FCS being within a predefined range. The predicted relative humidity value may be based on a measured HRS tank pressure, a measured FCS anode port pressure, and a predicted FCS anode port pressure from the model. The method may further include predicting a flow rate of a secondary nozzle of an ejector of the HRS based on linearized dynamic equations defining the model. The predicting may include applying of polynomial chaos estimation to the humidification control strategy to compensate for uncertainty. The predicting may include filtering outputs of the humidification control strategy to compensate for uncertainty. The method may include calculating an ejector flow rate based on an area of a virtual nozzle of an ejector of the HRS derived from a geometry of the ejector, a Mach number of a primary flow, pressure values at two inlets of the ejector, and properties of primary and secondary fluids. The method may further include identifying a state of a membrane of the FCS based on the value and may output the state. The method may further include identifying, via a time-varying model of the HRS, a consumption of reactants and a generation of products in the FCS. The method may further include adjusting, via a feedback controller, a regulated hydrogen pressure signal of the model such that a value of the signal converges with a value of and the actual pressure measurement converge to a substantially equal value.

A humidity estimation method for an anode port of a FCS includes outputting via a controller an activation sequence for an ejector of a HRS based on data received from a polynomial chaos-based estimator to control a flow rate of coolant at the port. The outputting is in response to occurrence of a predefined humidity condition at the port. The method may further include estimating a flow rate of a secondary nozzle of the ejector based on linearized dynamic equations of a model of the HRS. The method may further include calculating an ejector flow rate based on a geometry of the ejector, a Mach number of a primary flow, pressure values at two inlets of the ejector, and properties of a primary and a secondary fluid. The method may further include estimating a stoichiometric ratio of fuel within the HRS based on a predicted flow rate of the ejector.

A fuel cell vehicle includes a HRS and a controller. The HRS includes an ejector and a FCS having an anode port. The controller is configured to activate a HRS model to calculate a real-time estimate of a relative humidity of the anode port based on an estimated flow rate of a secondary nozzle of the ejector. The relative humidity estimation may be based on tank pressure, anode inlet pressure, FCS inlet and outlet temperatures, and FCS current. The controller may be further configured to apply a filtering technique to outputs of a humidification control strategy to compensate for uncertainty of the relative humidity calculation. The controller may be further configured to operate the HRS such that a predefined amount of nitrogen and water are purged from the HRS based on a stoichiometric ratio of substances at the anode port. The controller may be further configured to apply a state and parameter estimation technique to compensate for uncertainty of the relative humidity estimation. The controller may be further configured to linearize dynamic equations of the model to predict a flow rate of the secondary nozzle of the ejector. The controller may be further configured to calculate an ejector flow rate based on a geometry of the ejector, a Mach number of a primary flow of the ejector, pressure values at inlets of the ejector, and properties of a primary and secondary fluid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
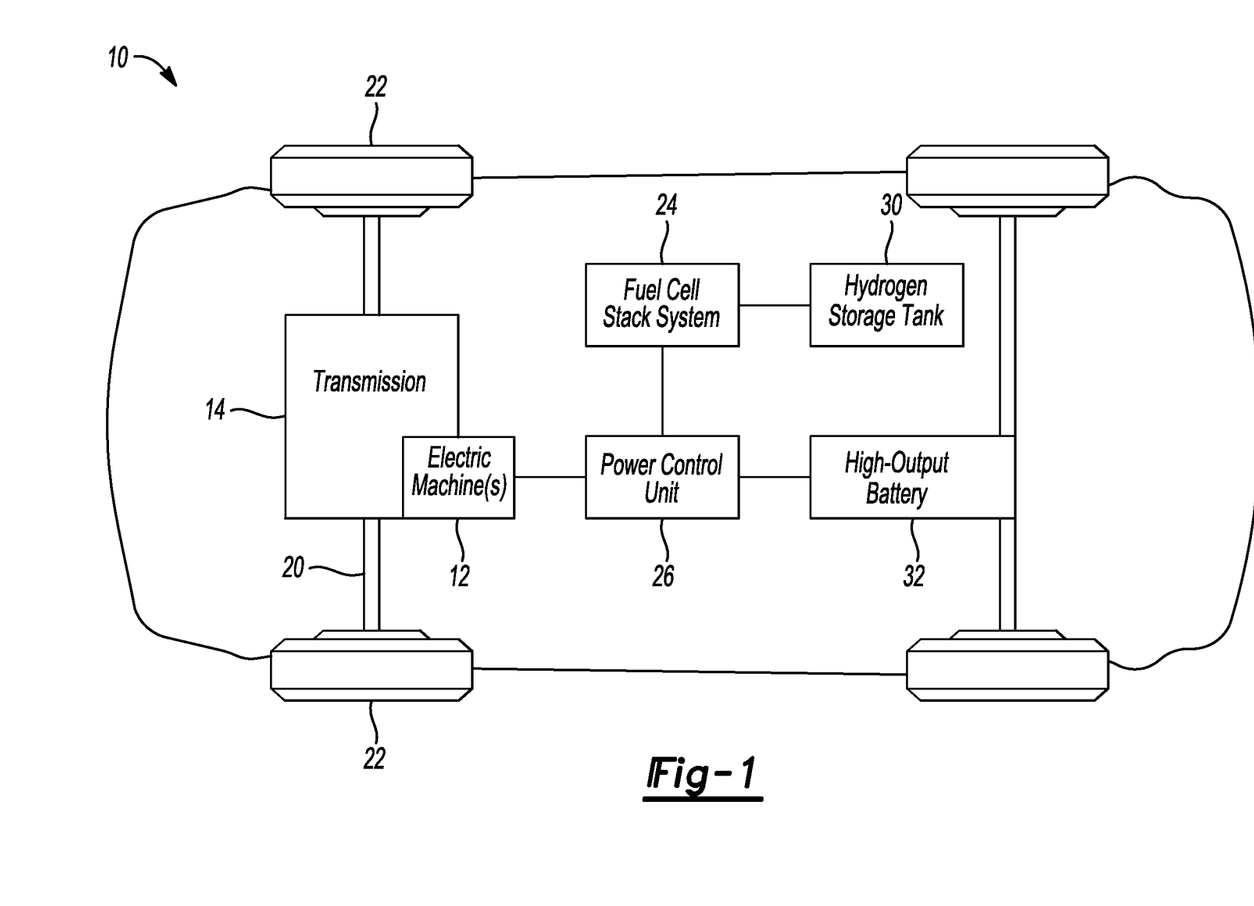
FIG. 1 is a schematic depicting an example of a fuel cell vehicle.

FIG. 1 depicts a schematic of an example of a fuel cell vehicle (FCV), referred to generally as a vehicle 10 herein. The vehicle 10 may include one or more electric machines 12 mechanically connected to a transmission 14. The electric machines 12 may be capable of operating as a motor or a generator. The transmission 14 may also be mechanically connected to a drive shaft 20 that is mechanically connected to a set of front wheels 22. The electric machines 12 may provide propulsion and deceleration capability. A fuel cell stack 24 may generate electric current to power components of the vehicle 10. For example, a hydrogen recirculation system may operate with the fuel cell stack to convert hydrogen gas and oxygen into electric current to power the electric machines 12. The electric current may be referred to as a load. The fuel cell stack 24 may include one or more fuel cells, such as a polymer electrolyte membrane (PEM) fuel cell. A power control unit 26 may govern a flow of electricity within the vehicle 10. For example, the power control unit 26 may govern the flow of electricity between the fuel cell stack 24 and the electric machines 12. A hydrogen storage tank 30 may store hydrogen gas for use the fuel cell stack 24. A high-output battery 32 may store energy generated from, for example, a regenerative braking system and may provide supplemental power to the electric machines 12.

The various components described above may have one or more associated controllers to control and monitor the operation of the components. The controllers may communicate via a serial bus (e.g., Controller Area Network (CAN)) or via discrete conductors.

Figure 2:
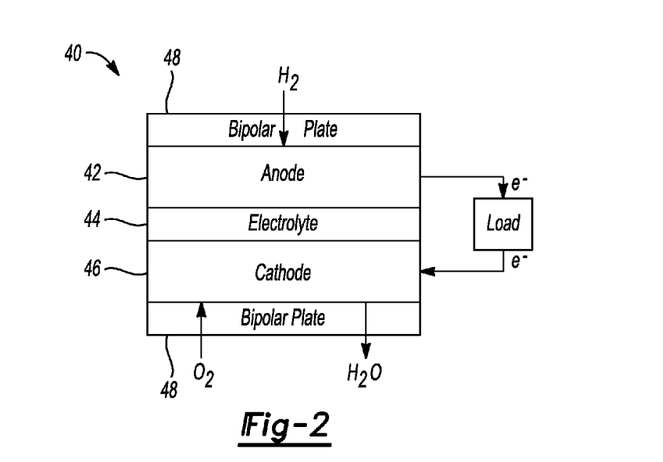
FIG. 2 is a schematic depicting an example of a fuel cell.

FIG. 2 depicts a schematic of an example of a PEM fuel cell, referred to generally as a PEM fuel cell 40 herein. The PEM fuel cell 40 is one example of a fuel cell which may operate in the fuel cell stack 24 described above. The PEM fuel cell 40 may include an anode 42, an electrolyte 44, and a cathode 46. Chemical reactions may occur at interfaces between the anode 42, the electrolyte 44, and the cathode 46, respectively. For example, the anode 42 may receive a fuel, such as hydrogen, and oxidize the fuel to convert the fuel into a positively charged ion and a negatively charged electron. The electrolyte 44 may permit the ions to pass through to the cathode 46 while redirecting the electrons around the electrolyte 44 to create a load. The electrons may rejoin the ions within the cathode 46. The cathode 46 may receive a chemical, such as oxygen, to react with the ions and electrons to create, for example, water or carbon dioxide. Bipolar plates 48 may assist in distributing fuel and oxidant within the PEM fuel cell 40, facilitating water management with the PEM fuel cell 40, separating fuel cells within a fuel cell stack, and facilitating thermal management of the PEM fuel cell 40.

Water management relating to a system including a fuel cell, such as the PEM fuel cell 40, may affect a performance thereof. For example, electrodes of the fuel cell may be flooded by liquid water with excess hydration above a normal state which may cause fuel starvation, cell potential or current reversal, or corrosion of the electrodes and bipolar plates. In contrast, too little hydration may cause a higher resistance to proton transport in a membrane, e.g. an electrolyte, of the fuel cell and may facilitate radical scavenging of the membrane. S wings in a hydration state of the system may cause mechanical stresses in the membrane that may also lead to premature membrane failures. Fuel cell start-up and shut down conditions may also rely on water management and particularly under cold conditions.

Control strategies may vary hydration conditions during operation of the system by adjusting temperatures, flow rates, pressures, and electrical current draw to improve the performance and extend a life of the system. The control strategies may use an accurate measurement or estimate of the hydration state of the fuel cell to facilitate operation thereof. A method to estimate a relative humidity of an anode inlet stream in real-time based on output from polynomial chaos based estimators may eliminate a need for a relative humidity (or dew point temperature) sensor within a hydrogen recirculation system as now described.

Figure 3:
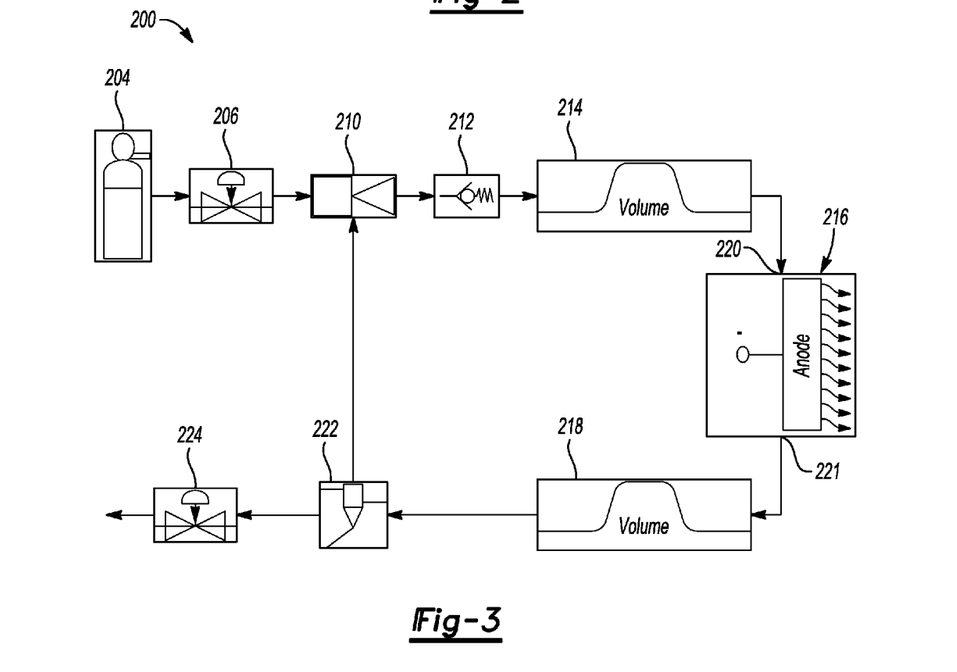
FIG. 3 is a schematic depicting an example of a hydrogen recirculation system of a fuel cell vehicle.

FIG. 3 shows an example of a hydrogen recirculation system, referred to generally as a hydrogen recirculation system 200. The hydrogen recirculation system 200 may operate with a fuel cell, such as the PEM fuel cell 40 described above. The hydrogen recirculation system 200 may include a tank 204, a first valve 206, an ejector 210, a check valve 212, a first pipe 214, a fuel cell stack 216, a second pipe 218, a knockout drain 222, and a second valve 224. The tank 204 may include dry hydrogen. The first valve 206 may be a pressure control valve to facilitate introduction of a predetermined amount of dry hydrogen to the ejector 210. The dry hydrogen may mix with a hydrogen gas mixture entering the ejector 210 from the knockout drain 222. The exiting gas mixture from the ejector 210 may pass through the check valve 212 and the first pipe 214 enroute to the fuel cell stack 216. A portion of the gas mixture may be consumed by the fuel cell stack 216 and water and nitrogen crossing over from a cathode (not shown) may join the gas mixture within the fuel cell stack 216 to define a fuel stack exit mixture. The fuel stack exit mixture may then pass through the second pipe 218 enroute to the knockout drain 222. Liquid water of the fuel stack exit mixture may be removed by the knockout drain 222. The knockout drain 222 may also remove some nitrogen gas and hydrogen gas. A predefined amount of nitrogen and water may be purged based on a stoichiometric ratio of substances at the anode port. A remainder of the gas of the fuel stack exit mixture may be directed back to the ejector 210. The second valve 224 may then purge any remaining liquid in the hydrogen recirculation system 200.

A set of three state equations may assist in providing a dynamic model of the hydrogen recirculation system 200. The three states are primary pressure P1 of the ejector 210, a pressure $P_{up}$ in the first pipe 214, and a pressure $P_{ds}$ in the second pipe 218. A static model of the ejector 210 may link the three dynamic equations. An estimator may use the model of the hydrogen recirculation system 200 to calculate consumption of reactants and generation of products within the fuel cell stack 216. The model may calculate molar fractions of gas components of the hydrogen recirculation system 200 and may predict a relative humidity of hydrogen gas at an anode port such as an anode inlet port 220 or an anode outlet port 221. The estimator may use a linearized model or a non-linearized model. It is contemplated that a model of the hydrogen recirculation system 200 may operate without using volumetric calculations of the first pipe 214 and the second pipe 218. For example, a set of equations that uses a static model of the ejector 210 may include 0, 1, 2, or more dynamic equations. The static and/or dynamic equations may predict the primary and secondary flow rates. The uncertainty in the predictions could be reduced by parameter estimation and filtering.

Figure 4:
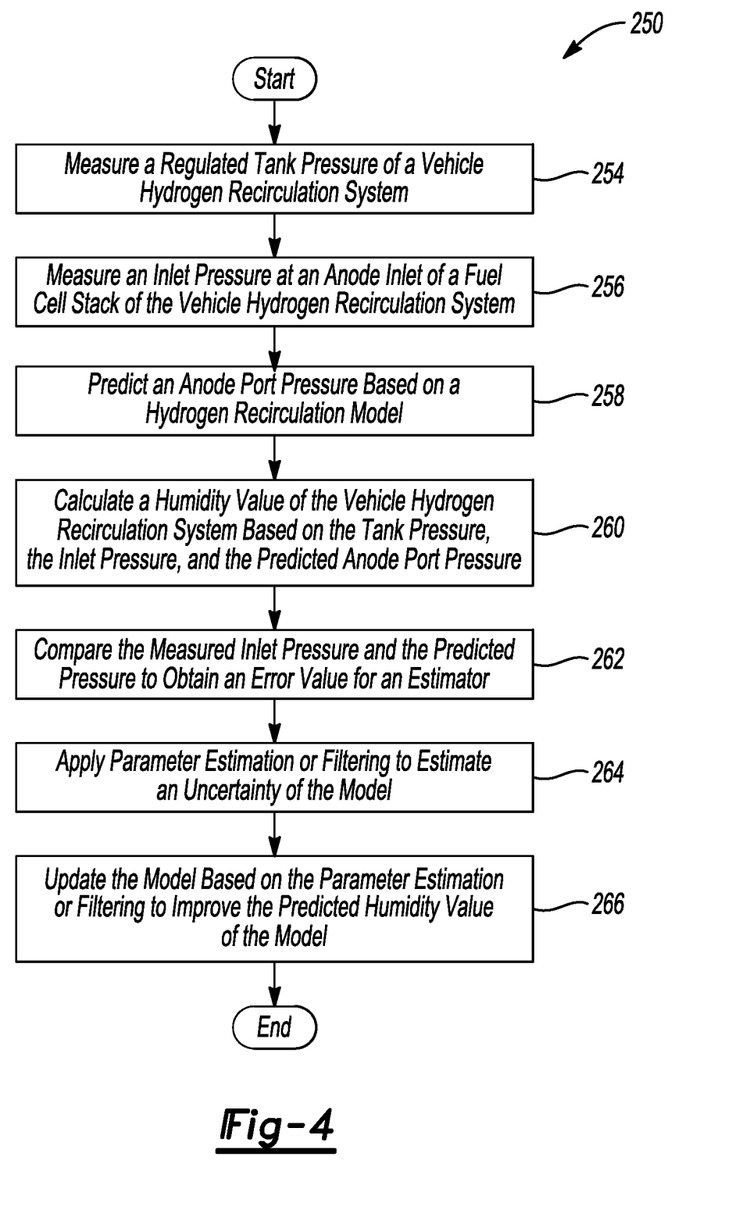
FIG. 4 is a flow chart illustrating an example of an algorithm for operation of a relative humidity estimating architecture for an anode port of a fuel cell stack.

A linearized model may add uncertainty to the model's prediction of a flow rate through a secondary nozzle of an ejector, such as the ejector 210. A polynomial chaos-based estimation technique may be used to reduce the uncertainty and to improve a relative humidity estimate. FIG. 4 shows an example of an algorithm for parameter estimation to improve the humidity prediction, referred to generally as an algorithm 250. A sensor may measure a pressure of a tank at operation 254. An inlet pressure value of a fuel cell stack may be calculated in operation 256. In operation 258, a pressure of an anode port may be predicted based on a hydrogen recirculation system model. In operation 260, a humidity value may be calculated based on the tank pressure and the inlet pressure. The measured inlet pressure and the predicted pressure may be compared to obtain an error value in operation 262. In operation 264, parameter estimation or filtering may be applied to estimate an uncertainty of the model. The model may then be updated based on the parameter estimation or filtering to improve the predicted humidity value of the model in operation 266.

Figure 5:
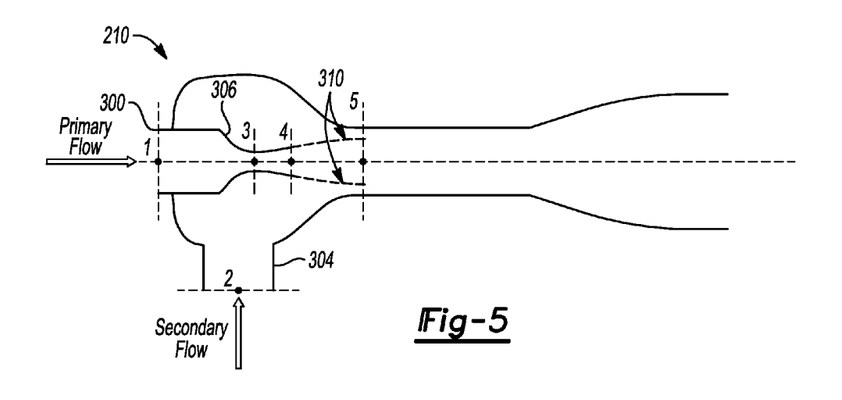
FIG. 5 is a schematic depicting an example of an ejector of the hydrogen recirculation system of FIG. 2.

FIG. 5 shows an example of a model of the ejector 210 for use by the estimator. A primary flow of hydrogen from the tank 204 may enter a first inlet 300 of the ejector 210 at position 1. A secondary flow from the knockout drain 222 may enter a second inlet 304 of the ejector 210 at position 2. The primary flow may accelerate to sonic speeds in a primary nozzle 306 at position 3. Dotted lines between positions 4 and 5 may illustrate a virtual nozzle 310. The primary flow and secondary flow may both reach a sonic speed within the virtual nozzle 310 at position 5. An area of the virtual nozzle 310 may be based on a geometry of the ejector 210, a Mach number of the primary flow, pressure values at the first inlet 300 and the second inlet 304, and properties of fluids of the primary flow and the secondary flow. A linear fit may be applied to Mach numbers and an area of a secondary flow nozzle at position 5 for different pressure ratios. Dynamic equations of the hydrogen recirculation system 200 may be linearized by applying the linear fit.

For example, $$\dot{P}_1 = -\frac{1}{\tau}(1 + k_T k_1)P_1 + \frac{1}{\tau}P_R \quad (1)$$

$$\begin{bmatrix} \dot{P}_{up} \\ \dot{P}_{ds} \end{bmatrix} = \begin{bmatrix} -k_{up}k_{\Delta P} & k_{up}(k_{\Delta P} + A_0\theta) \\ k_{ds}k_{\Delta P} & -k_{ds}(k_{\Delta P} + A_0\theta) \end{bmatrix} \begin{bmatrix} P_{up} \\ P_{ds} \end{bmatrix} + \begin{bmatrix} k_{up}((k_1 - k_A\theta)P_1 - k_I I) \\ k_{ds}(k_A\theta P_1 - k_I I + W_x - W_{KO}) \end{bmatrix} \quad (2)$$

where $P_1$ is a pressure of fluid at the primary inlet of the ejector, $P_{up}$ is a pressure of fluid at an inlet of the fuel cell stack anode i.e., upstream pressure, $P_{ds}$ is a pressure of the fluid at an outlet of the fuel cell stack anode, i.e., downstream pressure, $P_R$ is the measured regulated tank (or hydrogen source) pressure, $k_T$ is a coefficient relating ejector inlet pressure to a mass flow rate of the fluid out of the tank (or hydrogen source), $k_1$ is a coefficient related to properties of the primary fluid, and a geometry of the ejector primary nozzle, $k_{up}$ is a coefficient related to volume, temperature, molar mass, and other properties of the upstream fluid, $k_{\Delta P}$ is a coefficient that relates a pressure drop across the stack anode to the flow rate through the stack, $k_{ds}$ is a coefficient related to volume, temperature, molar mass, and other properties of the downstream fluid, $A_0$ is a y-intercept of the linear fit to the ejector secondary nozzle area, $k_A$ is a slope of the linear fit to the ejector secondary nozzle area, $k_I$ relates an anode pressure drop to an electrical current of the stack, $W_x$ is a flow rate of fluid from the cathode to the anode inside the stack, $W_{KO}$ is a mass flow rate of fluid out of the anode knock-out drain, and $\theta$ is the estimation parameter.

Inefficiencies and modeling simplifications may add uncertainty in the calculation of the secondary nozzle area and the mass flow rate of the secondary fluid into the ejector 210. This uncertainty is modeled in Eqn. (2) by the inclusion of the parameter $\theta$. Maximum likelihood estimation techniques built on polynomial chaos theory may be used to estimate the uncertain parameter $\theta$. For example, $\theta$ may be expanded in terms of a chaos variable $\xi$, which is a random variable with known prior distribution. If $\theta$ has known lower $\theta_{min}$ and upper $\theta_{max}$ bounds, $\xi$ may be a uniformly distributed random variable on the interval $[-1,1]$. The unknown variable $\theta$ can be written in terms of $\xi$ as follows $$\theta(\xi) = \theta_0 + \theta_1\xi, \theta_0 = \frac{\theta_{min} + \theta_{max}}{2}, \theta_1 = \frac{\theta_{max} - \theta_{min}}{2} \quad (3)$$

The state equations of Eqn. (2) can be approximated as expansion of orthogonal polynomial functions $\phi(\xi)$ of the chaos variable.

$$\hat{P}_{up}(t,\xi) = \Sigma_{i=0}^{S-1} x_{up,i}(t)\phi_i(\xi)$$

$$\hat{P}_{ds}(t,\xi) = \Sigma_{i=0}^{S-1} x_{ds,i}(t)\phi_i(\xi) \quad (4)$$

The expansions of Eqn. (4) may be substituted back into Eqn. (2) and then projected onto the orthogonal basis functions $\phi(\xi)$. This results in an expanded set of state equations, where the expansion coefficients $x_{up,i}$ and $x_{ds,i}$, $i=0, \ldots, S-1$ are the system states.

In Eqn. (5), $\mathbb{I}$ is the S×S identity matrix. For example, $$\begin{bmatrix} [\dot{X}_{up}] \\ [\dot{X}_{ds}] \end{bmatrix} = \begin{bmatrix} [-k_{up}k_{\Delta P}\mathbb{I}] & [k_{up}(k_{\Delta P} + A_0\theta_0)\mathbb{I} + k_{up}A_0\theta_1\mathbb{M}_\xi] \\ [k_{ds}k_{\Delta P}\mathbb{I}] & [-k_{ds}(k_{\Delta P} + A_0\theta_0)\mathbb{I} - k_{ds}A_0\theta_1\mathbb{M}_\xi] \end{bmatrix} \begin{bmatrix} [X_{up}] \\ [X_{ds}] \end{bmatrix} + \begin{bmatrix} [k_{up}((k_1 - k_A\theta_0)P_1 - k_I I)\mathbb{B}_1 - k_{up}k_A\theta_1 P_1\mathbb{B}_\xi] \\ [k_{ds}(k_A\theta_0 P_1 - k_I I + W_x - W_{KO})\mathbb{B}_1 + k_{ds}k_A\theta_1 P_1\mathbb{B}_\xi] \end{bmatrix} \quad (5)$$

Eqn. (5) may also use the following definitions $$X_{up} := \begin{bmatrix} x_{up,0} \\ \vdots \\ x_{up,S-1} \end{bmatrix}, X_{ds} := \begin{bmatrix} x_{ds,0} \\ \vdots \\ x_{ds,S-1} \end{bmatrix} \quad (6)$$

$$\mathbb{M}_1 := \begin{bmatrix} \langle\phi_0,\phi_0\rangle & \cdots & 0 \\ \vdots & \ddots & \vdots \\ 0 & \cdots & \langle\phi_{S-1},\phi_{S-1}\rangle \end{bmatrix} \quad (7)$$

$$\mathbb{M}_\xi := \mathbb{M}_1^{-1}\begin{bmatrix} \langle\xi\phi_0,\phi_0\rangle & \cdots & \langle\xi\phi_{S-1},\phi_0\rangle \\ \vdots & \ddots & \vdots \\ \langle\xi\phi_0,\phi_{S-1}\rangle & \cdots & \langle\xi\phi_{S-1},\phi_{S-1}\rangle \end{bmatrix} \quad (8)$$

$$\mathbb{B}_1 := \mathbb{M}_1^{-1}\begin{bmatrix} \langle 1,\phi_0\rangle \\ \vdots \\ \langle 1,\phi_{S-1}\rangle \end{bmatrix} \quad (9)$$

$$\mathbb{B}_\xi := \mathbb{M}_1^{-1}\begin{bmatrix} \langle\xi,\phi_0\rangle \\ \vdots \\ \langle\xi,\phi_{S-1}\rangle \end{bmatrix} \quad (10)$$

Eqn. (5) is not a function of $\xi$ but is deterministic due to projection aspects. Since linear, exact numerical integration assuming a zero order hold may be used to solve once initial conditions are known. Equation (5) may be used when a solenoid valve upstream of the ejector is open. When the solenoid valve is closed, the pressures $P_1$ and $P_{ds}$ may become equal to the measured pressure $P_{up}$. Therefore, for initial conditions, and whenever the upstream valve is closed (which may be frequent due to the pulsed operation of the ejector) states of Eqn. (5) may be set to the following values $$x_{up,0}=P_{up}, x_{up,i}=0, i=1,\ldots,S-1$$

$$x_{ds,0}=P_{up}, x_{ds,i}=0, i=1,\ldots,S-1 \quad (11)$$

$$P_1=P_{up}$$

The operation of the ejector may be pulsed, and therefore the equations may be reset frequently to their measured values of Eqn. (11). Resetting to the measured values of Eqn. (11) may assist in avoiding drift in the state trajectories of Eqns. (5) and (1). Solving Eqn. (5) in real-time provides expansion coefficients for Eqn. (4), and therefore the random processes $P_{up}$ and $P_{ds}$ are (approximately) known in real-time. One goal of estimation is to determine the most likely realization of the random variable $\xi$. Given a realization of $\hat{\xi}$ of $\xi$, the random process may collapse into a deterministic trajectory. Therefore, maximum likelihood estimation aims to select the realization of $\hat{\xi}$ such that the resulting trajectory $\hat{P}_{up}(\hat{\xi})$ is most like the measured variable $P_{up}$. Assuming that measurement noise is additive and Gaussian, the maximum likelihood estimate will minimize the following optimization $$J_k(\xi)=\Sigma_{\tau=t_0}^{t_k}\beta^\tau(P_{up}(\tau)-\hat{P}_{up}(\tau,\xi))^2 \quad (12)$$

where $\beta$ is a forgetting factor and equivalent to minimizing a function $$J_k(\xi)=D_k^{P_{up}P_{up}}-2\Phi(\xi)D_k^{XP_{up}}+\Phi(\xi)D_k^{XX^T}(\Phi(\xi))^T \quad (13)$$

where $$D_k^{AB}:=\beta D_{k-1}^{AB}+AB \quad (14)$$

and $$\Phi(\xi):=[\phi_0 \phi_1 \ldots \phi_{S-1}] \quad (15)$$

Since Eqn. (14) is not dependent on the unknown parameter $\xi$, the estimate $\hat{\xi}_{k-1}$ at the previous time step $t_{k-1}$ has no effect on the estimate $\hat{\xi}_k$ of the current time step $t_k$. A variety of techniques may be used determine the estimate of $\hat{\xi}_k$. As an example, a realization $\hat{\xi}_{guess}$ of $\xi$ may be chosen randomly from the interval $[-1,1]$ at each time step, and a corresponding cost may be compared with a cost of the previous best realization $\hat{\xi}_{k-1}$. An algorithm may keep the realization with the lowest cost $$\hat{\xi}_k=\mathrm{argmin}_{\hat{\xi}_{k-1},\hat{\xi}_{guess}}\{J_k(\xi)\} \quad (16)$$

The result may be substituted into Eqn. (3) which becomes the current estimate $\hat{\theta}_k$ of $\theta$.

$$\hat{\theta}_k=\theta_0+\theta_1\hat{\xi}_k \quad (17)$$

As the estimator acquires more information its prediction of $\theta$ improves and uncertainty in the model is reduced to improve the model's ability to accurately predict the relative humidity of fluid at, for example, the anode inlet port 220 or anode outlet port 221 of the fuel cell stack 216.

In another example, the estimator may use a nonlinear and time-varying model of the hydrogen recirculation system to predict a relative humidity of hydrogen gas at an anode port such as the anode inlet port 220 or the anode outlet port 221. In this example, the model may calculate consumption of reactants and generation of products in the fuel cell stack 216 such as molar fractions of the gas components. To improve the relative humidity prediction, a feedback controller may adjust the model's regulated hydrogen pressure signal around the measured pressure such that the difference between the model's prediction and the measurement of the anode inlet pressure converges to zero. The feedback controller may be, for example, a proportional integral derivative, model predictive, or state-observer/feedback.

Figure 6:
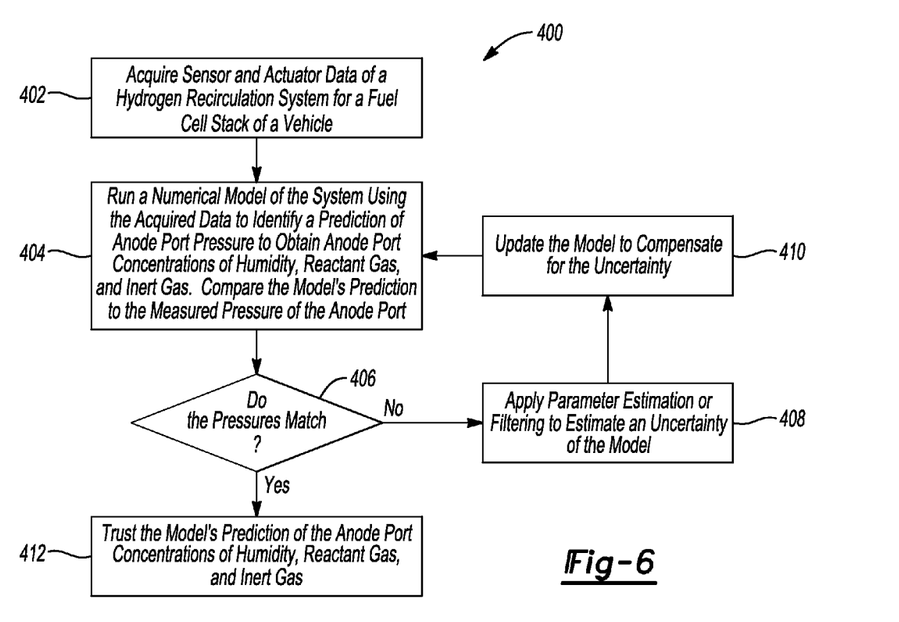
FIG. 6 is a flow chart illustrating an example of an algorithm for operation of a relative humidity estimating architecture for an anode port of a fuel cell stack.

FIG. 6 shows an example of an algorithm for parameter estimation or filter estimation to improve a humidity prediction of a portion of a hydrogen recirculation system, referred to generally as an algorithm 400. In operation 402, sensor and actuator data of a hydrogen recirculation system for a fuel cell stack of a vehicle may be acquired. In operation 404, a controller may activate a numerical model of the hydrogen recirculation system may be run using the acquired data to identify a prediction of a pressure of an anode port of the system to obtain anode port concentrations of humidity, reactant gas, and inert gas. The reactant gas, for example, may comprise a stoichiometric ratio of substances of the anode port. Further, the controller may compare the model's prediction to the measured pressure of the anode port to identify whether the pressures match in operation 406. If the pressures do not match, the controller may activate parameter estimation or filtering to estimate an uncertainty of the model in operation 408. In operation 410 the model may be updated to compensate for the uncertainty such that the numerical model may be activated again in operation 404 with updated data. If the pressures match in operation 406, the model's prediction of the anode port concentrations of humidity, reactant gas, and inert gas may be trusted to calculate a relative humidity value of the anode port of the system.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A fuel cell stack (FCS) water management method comprising:
    measuring pressures of a tank and an anode inlet;
    accessing a model predicted anode port relative humidity value based on the measurements; and
    responsive to the predicted value being within a predefined range, outputting an FCS anode port estimated relative humidity value based on consumption of reactants and generation of products in the FCS and adjusting a humidification control strategy based on the estimated value.

2. The method of claim 1 further comprising predicting a flow rate of a secondary nozzle of an ejector of a hydrogen recirculation system of the model based on linearized dynamic equations defining the model.

3. The method of claim 2, wherein the predicting includes applying a polynomial chaos estimation to the humidification control strategy to compensate for uncertainty.

4. The method of claim 2, wherein the predicting includes filtering outputs of the humidification control strategy to compensate for uncertainty.

5. The method of claim 1 further comprising calculating an ejector flow rate based on an area of a virtual nozzle of an ejector of a hydrogen recirculation system of the model derived from a geometry of the ejector, a Mach number of a primary flow, pressure values at two inlets of the ejector, and properties of primary and secondary fluids.

6. The method of claim 1 further comprising identifying a state of a membrane of the FCS based on the anode port estimated relative humidity value and outputting the state.

7. The method of claim 1, further comprising identifying, via a time-varying model of a hydrogen recirculation system of the model, a consumption of reactants and a generation of products in the FCS.

8. The method of claim 1 further comprising adjusting, via a feedback controller, a regulated hydrogen pressure signal of the model such that a value of the signal and the actual pressure measurement converge to a substantially equal value.

* * * * *